W. T. ZIMMER.
BEATER.
APPLICATION FILED OCT. 21, 1919.

1,332,788.

Patented Mar. 2, 1920.

WITNESSES

INVENTOR
William T. Zimmer.
BY
ATTORNEYS

UNITED STATES PATENT OFFICE.

WILLIAM THEODORE ZIMMER, OF NEW YORK, N. Y.

BEATER.

1,332,788.  Specification of Letters Patent.  Patented Mar. 2, 1920.

Application filed October 21, 1919. Serial No. 332,175.

*To all whom it may concern:*

Be it known that I, WILLIAM T. ZIMMER, a citizen of the United States, and a resident of the city of New York, Ridgewood, borough of Queens, in the county of Queens and State of New York, have invented a new and Improved Beater, of which the following is a full, clear, and exact description.

It is well appreciated among users of beaters that when the head and handle of a beater are constructed of ratan, as is usually the case, the various strands of the ratan become disassociated from one another long before the beater has completed its usefulness.

The parting of the various threads usually commences at the point of joining between the handle and the head of the beater, which, due to the rough usage to which an article of this nature is subjected, quickly results in the complete detachment of the head from the handle, so that the beater must be thrown away.

It has, further, been experienced that the handles of beaters have often become broken due to too vigorous handling on the part of the users, which also results in the discardment of the beater.

Having in mind the above defects, I have constructed a beater in which it will be possible to have all the various parts subjected to an even wear so that the same will not have to be thrown away due to the fact that the connection established between the strands of the head and body has become loosened, although the other parts of the beater are in good condition.

A still further object of my invention is the provision of a beater which may be constructed in various sizes, so as to be capable of being utilized for any purpose from that of the heavy carpet beater to a small velvet beater, the handle in all of such beaters being so constructed that no possibility of breakage exists.

Reference is had to the attached sheet of drawings which illustrates one practical embodiment of my invention, and in which—

Figure 1:
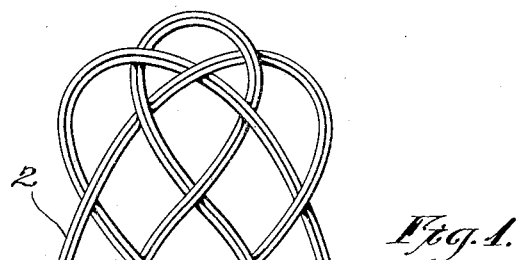
Figure 1 is a plan view of the handle and head of a beater constructed in accordance with my invention.

In these various views like reference numerals designate similar parts, and the reference numeral 1 indicates any desired number of ratans which are intertwined, as indicated at 2, to form a head.

Figure 2:
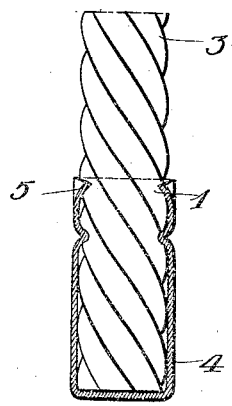
Fig. 2 is an enlarged sectional view taken along line 2—2 of Fig. 1.

It will be noted, however, that the ratans 1 have their ends extending downwardly and are coiled one around the other so as to form a handle 3, which is simply a continuation of the original piece of ratan 1. Referring more particularly to Fig. 2, it will be noted that the free ends of the ratans 1 form the handle 3 terminate in substantially the same plane, and are retained in applied position by means of a cap 4 which may be conveniently indented, as indicated at 5, to prevent movement of the various parts.

It will be seen that by virtue of the above arrangement the usual connection between the head and handle of a beater is eliminated; and it will be perfectly obvious that no weak points will be found in the construction in its entirety and, therefore, a uniform wearing of the parts will be effected, which will assure the user of a maximum of wear.

Figure 3:
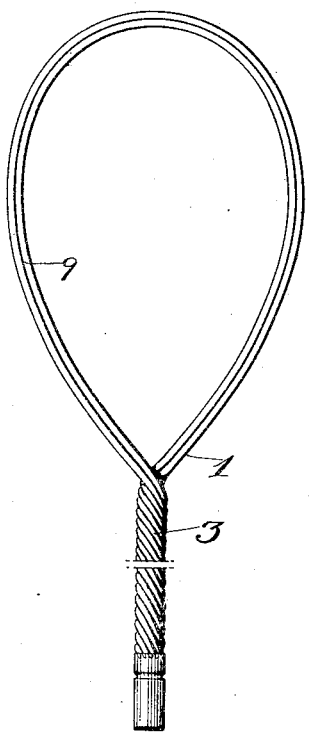
Fig. 3 is an enlarged sectional view taken along line 3—3 of Fig. 1.

It is appreciated, however, that the usual beater has a greater number of ratans in its handle than in its head, so that a stiff handle is provided; and as it would be inadvisable to strengthen the handle by a number of "fillers", I associate with the handle a stiff cloth-covered wire 6 which extends the entire length thereof, as has been indicated in Fig. 3, and has its upper end provided with a loop 7 through which passes a group of ratans of the head 2.

It is appreciated that it might be possible for the wire 6 to move with respect to the ratans forming the handle 3, and to eliminate this danger I pass an independent ratan 8 through the loop 7 and extend the ends of such ratan downwardly so that they form an addition to the handle 3.

Figure 4:
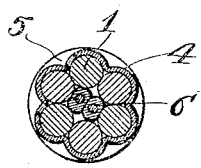
Fig. 4 is a beater, also constructed in accordance with my invention, eliminating certain details of the construction illustrated in Fig. 1 and having applied to its handle a slightly different form of head.

It will be appreciated that by virtue of the above construction I have provided a beater which will have uniform wearing qualities and which will be unusually strong, together with requiring a minimum of assembly work. By way of illustration of the latter feature, reference is had to Fig. 4, which indicates the modified form of beater, in which the head 9 is formed of one simple loop of two ratans 1, which ratans are extended downwardly to form a handle 3.

It will be understood that any number of weaves of head and handle might be resorted to without in the least departing from the scope of my claims.

I claim:

1. A beater, including a head and a handle, and a reinforcing element associated with such handle and having its upper end engaging the lower end of the head.

2. A beater, including a head and a handle, a reinforcing element within such handle and having its upper end engaging the lower end of the head, and means for retaining such reinforcing member in applied position.

3. A beater, including a head composed of a number of flexible members, such flexible members being continued to extend beyond the head and forming a handle, a reinforcing wire associated with such handle and being provided at its upper end with a loop passing around certain elements of the head, an additional flexible element associated with such handle and passing through such loop whereby to retain such reinforcing wire in applied position, and a cap securing the free ends of all of such elements and the wire in applied position.

WILLIAM THEODORE ZIMMER.